Aug. 19, 1969   M. WELHOELTER ET AL   3,461,719
CLAMPING SYSTEM
Filed July 1, 1966   4 Sheets-Sheet 1

INVENTORS
MILTON WELHOELTER
MERRILL JENKINS
BY
Robert J. Schaap
ATTORNEY

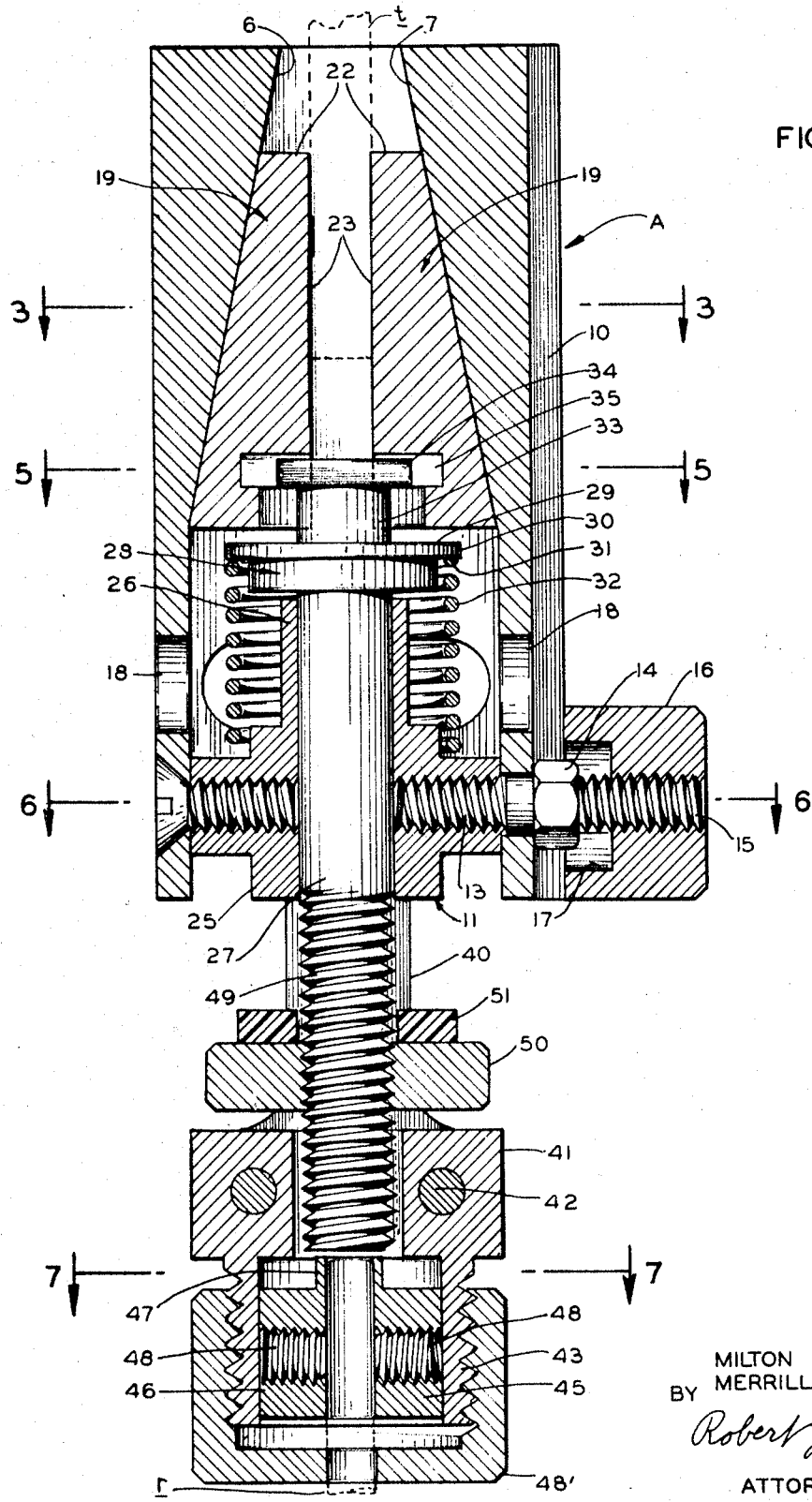

INVENTORS
MILTON WELHOELTER
MERRILL JENKINS
BY
Robert J. Schaap
ATTORNEY

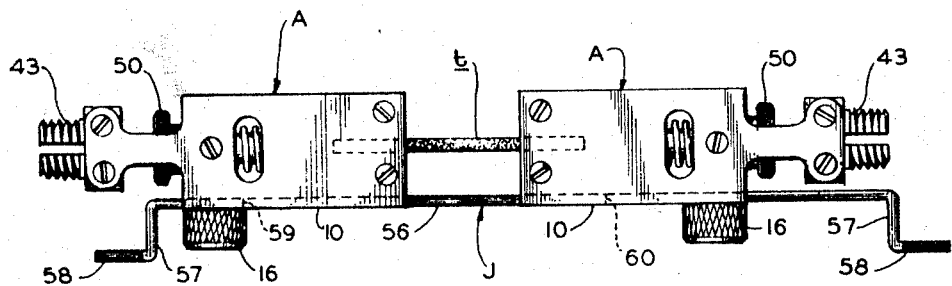
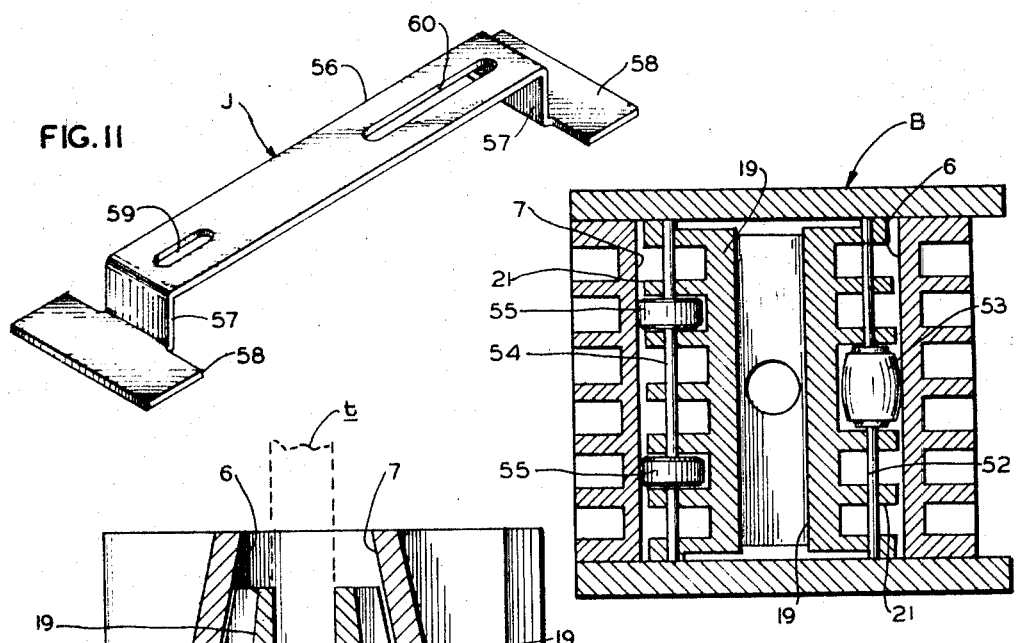
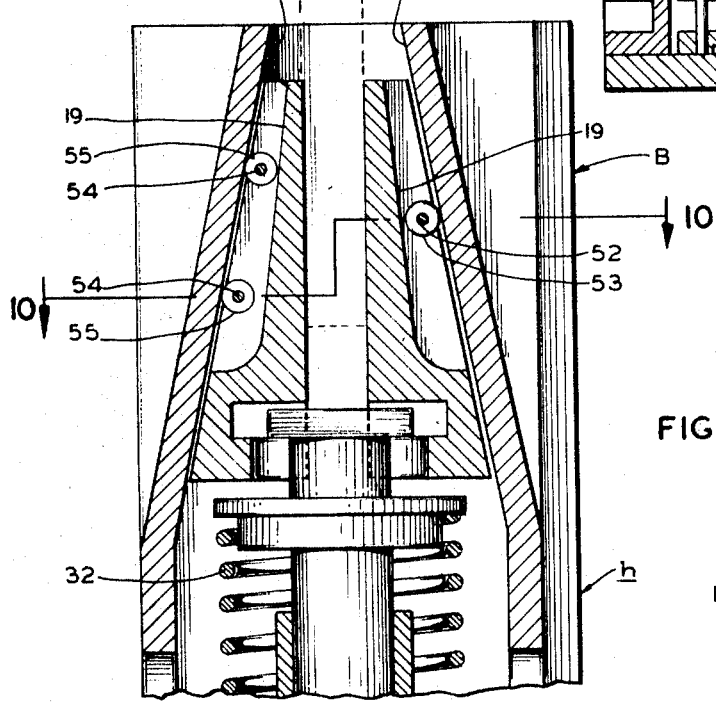

# United States Patent Office 3,461,719
Patented Aug. 19, 1969

3,461,719
CLAMPING SYSTEM
Milton Welhoelter, Rock Hill, and Merrill Jenkins, Spanish Lake, Mo., assignors to Monsanto Company, St. Louis, Mo., a corporation of Delaware
Filed July 1, 1966, Ser. No. 562,311
Int. Cl. G01n 3/02
U.S. Cl. 73—103                                           17 Claims

ABSTRACT OF THE DISCLOSURE

A clamping device for use with dynamic viscoelastometers and the like where the device includes an outer housing and a pair of jaws which are movable along wedge-shaped walls within the housing. When the jaws are projected towards each other, they will removably engage a plastic test sample. The jaws are urged towards each other by means of a spring action biasing a shaft which is in turn connected to the jaws. The jaws are removable from the housing by means of a knurled nut which is threaded about the shaft and bears against the housing for urging the shaft outwardly of the housing. A unique coupling device is mounted on the lower end of the housing for securing the clamping device to a stationary device.

---

This invention relates in general to certain new and useful improvements in clamping systems, and more particularly to a clamping mechanism which is designed to hold test specimens for visco-elastic measurements.

The displacement and mechanical deformation or so-called "creep" of structural elements, particularly those formed of plastic and synthetic resinous materials is a problem which often confronts the designer of structural elements. The manufacturers of plastic materials used in structural elements are most seriously confronted with the problem of designing the plastic material to overcome problems of mechanical deformation, deflection and displacement. Accordingly, during the processing and manufacture of plastic materials, it is often necessary to evaluate structural displacement and deformation of test strips of the plastic material. After the deflection measurements have been made, suitable plasticizers or other additives may be incorporated into the plastic material as necessary. It has been the practice to subject these structural elements to wide ranges of loading and simultaneously therewith measure the structural displacement or deformation appearing at various points along the structural element. Moreover, it has been the practice to measure the displacement or deformation as a function of time.

There are many commercially available devices for measuring the deformation or deflection of plastic test samples such as many commercially available extensometers. Generally, these devices place the sample between two clamps and measure the initial displacement or creep while force is placed on the test sample. However, careful setting and constant surveillance are required in order to eliminate unauthorized displacement. Furthermore, in many samples the amount of displacement is quite small and any slippage of the specimen in the clamp may cause gross errors in the final readings.

Often times, the samples were subjected to large temperature changes from extreme cold conditions to rather hot conditions. As the plastic sample was heated, it tended to flow and furthermore, the thickness of the sample was reduced by this tendency to flow. As a result, the sample was not securely fitted within the clamp and some slipping of the sample in the clamp often took place. Furthermore, the commercially available clamps are not adapted to provide even force distribution across each of the parallel faces of the sample, which is necessary for accurate measurement.

It is, therefore, the primary object of the present invention to provide a clamping system, which is capable of holding test specimens for visco-elastic measurements when the specimens are subjected to large temperature changes.

It is another object of the present invention to provide a clamp forming part of the present system which is capable of providing even force distribution across the parallel faces of the test specimen.

It is a further object of the present invention to provide a clamping system of the type stated which provides for even and accurate alignment of opposed clamps which hold the test specimen and therefore assure even force distribution across the entire specimen.

It is another object of the present invention to provide a clamping system of the type stated which is relatively economical to manufacture, has a high degree of reliability and is highly efficient for use in visco-elastic measurements.

It is another salient object of the present invention to provide a clamp of the type stated which does not place any undue and undesirable stresses upon the test specimen which would interfere with visco-elastic readings.

With the above and other objects in view, our invention resides in the novel features of form, construction, arrangement and combination of parts presently described and pointed out in the claims.

In the accompanying drawings:

FIGURE 2 is a vertical sectional view taken along line 2—2 of FIGURE 1;

FIGURE 9 is a fragmentary vertical sectional view, partially broken away, similar to the sectional view of FIGURE 2 and showing a modified form of clamping mechanism of the present invention;

FIGURE 10 is a horizontal sectional view taken along line 10—10 of FIGURE 9 and similar to the sectional view of FIGURE 3;

FIGURE 11 is a perspective view of a jig used for placing a specimen between two clamping devices forming part of the present invention; and FIGURE 12 is a side elevational view of the jig of FIGURE 11 with the two clamping devices operatively attached to the jig and a specimen extending between said clamping devices.

General Description

Figure 1:
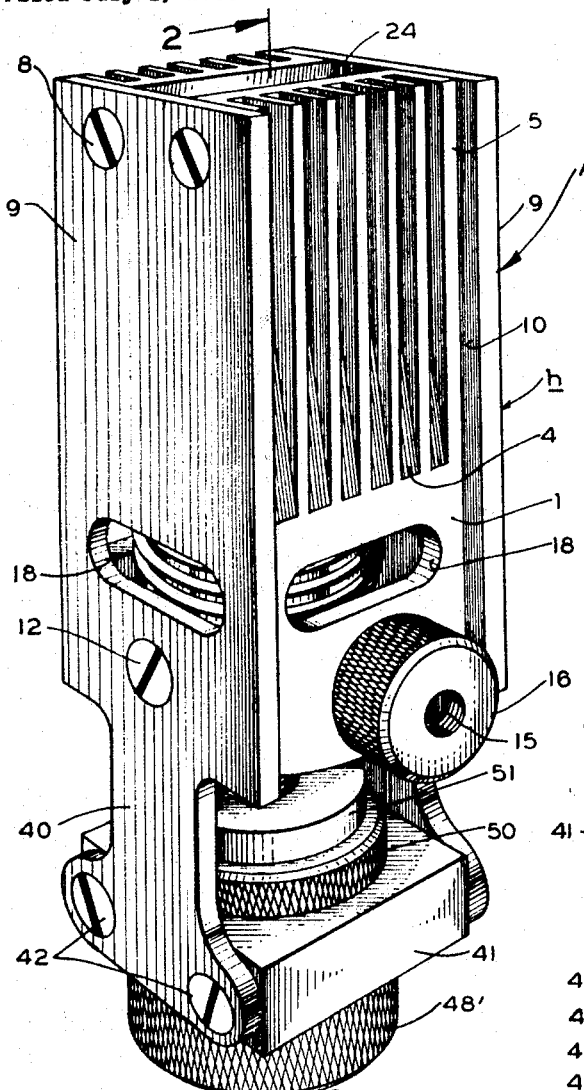
FIGURE 1 is a perspective view of a clamping device constructed in accordance with and embodying the present invention.

The present invention relates to a clamping system for retaining a test specimen to be used in deformation analysis such as in viscoelastometer type devices. The clamping system includes a pair of identical spaced opposed clamps for holding opposite ends of the test specimen. The system also includes a jig which is uniquely designed to temporarily retain and align each of the opposed clamps during the time that a test specimen is secured to each of the opposed clamps. The jig provides for proper alignment of the clamps and the test specimen with respect to the clamps and insures an even force distribution across the parallel faces of the test specimen.

The clamping device of the present invention generally comprises an outer housing having a pair of inclined front and rear walls, each being fluted on its external surface. The front and rear walls are connected by side walls forming an internal compartment in the housing. Shiftably disposed within the housing are a pair of spaced opposed wedges which move along the inclined walls and are, therefore, adapted to shift toward and away from each other. The wedges are spaced and are, therefore, adapted to accommodate a specimen or member to be clamped. A vertically shiftable bolt or shaft is operatively disposed within the housing and engages the lower end of the wedges and is shiftable therewith. The bolt is provided with an enlarged head and secured thereto is an enlarged plate which is spring biased so that the wedges are biased toward the closed position. A compression spring is interposed between a wall in the housing and the plate on the shiftable bolt in such manner that the wedges are forced against the inclined wall and toward a clamping position.

A knurled nut is disposed on an externally threaded portion of the shaft or bolt and is capable of being tightened against the housing in such manner that the bolt is urged in a direction outwardly of the housing. As this occurs, the head of the bolt and the plate secured thereto will be pulled to a position against the action of the spring so that the wedges are shifted out of clamping position or to the disengaged position.

Secured to the lower end of each of the end walls is a rectangularly shaped lower block which is internally bored to accommodate the lower end of the externally threaded bolt. The bolt or main shaft is also internally bored to accommodate a support shaft for securement to a testing device or similar instrument. The rectangular block is integrally provided with a downwardly extending circular nipple which is externally threaded and is diametrally slotted. The nipple is hollow and accommodates a retaining plug having a guide bar which extends through the slots in the nipple. The retaining plug is also centrally apertured to accommodate a stationary support rod and is provided with means for securing the rod to the plug. Finally, a knurled cap is disposed over the externally threaded nipple and holds the aforementioned elements securely in place.

The present invention also provides a modified form of clamping device which employs sets of rollers on each of the jaws or wedge members. One of said wedges or jaws is provided with two spaced axles and a pair of rollers are mounted on each of the axles. This provides for guiding movement and reduction of friction against the external plate, which serves as a guide. The other of the jaws or wedges is provided with one roller and is generally disposed in the center of the wedge. This type of arrangement allows the wedge to compensate for non-parallel opposite surfaces of the sample.

The present invention also provides the jig or so-called "fixture" for holding the clamps in proper alignment. The jig is provided with a small circular aperture to accommodate a bolt on one of the clamps and holds the clamp in the fixed position. The jig is also provided with a spaced elongated slot for accommodating an externally extending bolt on the other of said clamps. In this manner, the second of said clamps can be positioned longitudinally with respect to the first of said clamps at a desired distance.

Detailed descirption

Referring now in more detail and by reference characters to the drawings which illustrate practical embodiments of the present invention, A designates a clamping device preferably formed of stainless steel or similar metal and which is designed to retain transverse ends of test specimen. The clamping devices are generally designed for use in viscoelastometers of the type described in copending application Ser. No. 604,988, filed Dec. 22, 1966, or may be used in many of the commercially available dynamic modulus testers. However, it should be recognized that the clamping device A could be used in any application where uniform clamping force is necessary and where slippage is undesirable.

Figure 3:
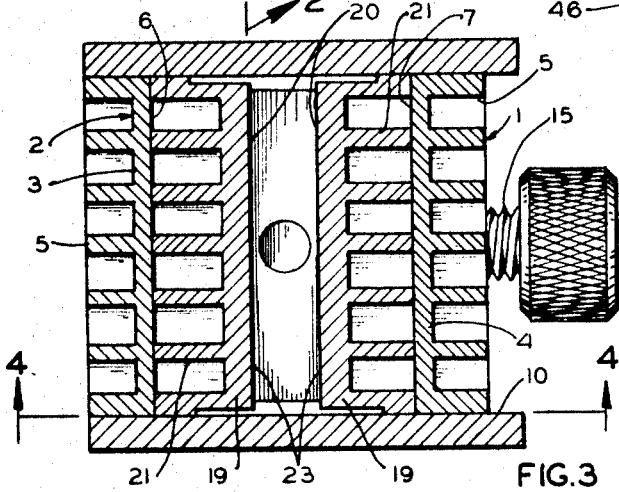
FIGURE 3 is a horizontal sectional view taken along line 3—3 of FIGURE 2 and showing the clamping wedges forming part of the present invention.

The clamping device A generally comprises an outer housing $h$ which is formed by a pair of relatively flat front and back walls 1, 2, each of which is integrally provided with upwardly and inwardly tapering oblique wall portions 3, 4, respectively. The wall portions 3, 4 are fluted and provided with outwardly extending support flanges or so-called flutes 5 in the manner as illustrated in FIGURE 1. The oblique wall portions 3, 4 have relatively smooth interiorly presented oblique walls which serve as wedging surfaces or so-called "guide surfaces" 6, 7, respectively. Secured to each of the transverse ends of the front and back walls 1, 2 by means of machine screws 8 are transverse end plates 9, each of which is provided with forwardly extending guide flanges 10. by reference to FIGURES 1 and 3, it can be seen that the flanges 10 extend forwardly of the flat portion of the front wall 1 for reasons which will presently more fully appear.

The housing $h$ is also provided with a base plate 11 which extends between the front and back walls 1, 2 and the end plates 9 and is secured to the end plates 9 by means of machine screws 12 on the end plates 9 and the back wall 2. The base plate 11 is secured to the front wall 1 by means of a bolt 13 having a nut 14 which engages the exterior face of the front wall 1 in the manner as illustrated in FIGURE 2. The bolt 13 is integrally provided with a forwardly extending externally threaded stud 15 for accommodating a removable knurled nut 16. By further reference to FIGURE 2, it can be seen that the nut 16 can be threaded on the stud 15 and is also provided with a central recess 17 for accommodating the nut 14. The front and back walls 1, 2 and the end plates 9 are each provided with elongated viewing apertures 18 which permit gaseous circulation into the housing $h$ when the clamping device is subjected to a gaseous atmosphere.

Disposed within the housing $h$ for vertically shiftable movement into and out of clamping position are a pair of oppositely disposed cooperating jaws 19. The jaws 19 are more fully illustrated in FIGURES 2, 3 and 5 and are trapezoidally shaped in vertical cross section. The jaws are also formed of stainless steel and each comprises a vertical plate 20 which is integrally formed with a plurality of longitudinally spaced outwardly extending flanges or so-called "flutes" 21 which engage each of the guide surfaces 6, 7. By reference to FIGURE 2, it can be seen that the flutes 21 are also obliquely shaped and since they are seperated by rather large grooves, the flutes 21 present a small surface contact area with the wedging surfaces 6, 7, thereby substantially reducing any friction which may occur as the jaws 19 are moved against the walls 6, 7. Furthermore, the clamping mechanism of the present invention may be used in apparatus subjected to large temperature changes. The flutes 21 also provide a reduced volume of the clamping device permitting rapid temperature change of the device without excessive binding of moving parts. The jaws 19 are also provided with a relatively flat top wall 22 and oppositely disposed interiorly presented specimen engaging walls 23 for engaging a test specimen $t$, the latter being shown in the dotted lines of FIGURE 2.

By further reference to FIGURE 2, it can be seen that the flutes 21 of the jaws 19 are also obliquely shaped and engage the oblique wedging surface 6, 7 as the jaws 19 are vertically shifted within the housing $h$. By means of this construction, it can be seen that when the jaws 19 are urged upwardly, reference being made to FIGURE 2, they are also urged toward each other and into engagement with the test specimen $t$, where the latter is held in a frictionally tight position. In like manner, when the jaws 19 are urged downwardly, they are permitted to separate and disengage the sample $t$, where the latter may be removed through an aperture 24 formed in the top wall of the housing $h$.

The base plate 11 is integrally provided with an enlarged central hub 25 having an integrally formed vertical extension 26 in the manner as illustrated in FIGURE 2. The hub 25 and vertical extension 26 are centrally bored and rotatably accommodate a vertically extending actuator shaft 27, which is integrally provided with a diametrally enlarged head 28. Rigidly secured to the enlarged head 28 and being movable with the shaft 27 is an actuator plate 29, the latter being provided with overhanging flanges 30, thereby forming downwardly presented shoulders 31. Extending between the plate 30 and the base plate 11 is a compression spring 32 which biases the actuator plate 29 and hence the actuator shaft 27 in an upward direction, reference being made to FIGURE 2.

Figure 5:
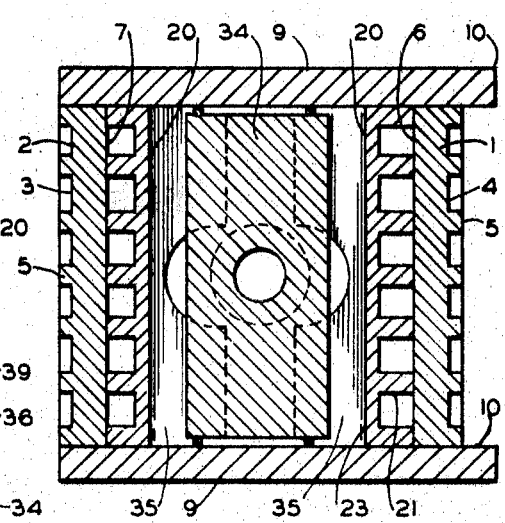
FIGURE 5 is a horizontal sectional view taken along line 5—5 of FIGURE 2 and showing a portion of the wedge driving mechanism of the present invention.
Figure 7:
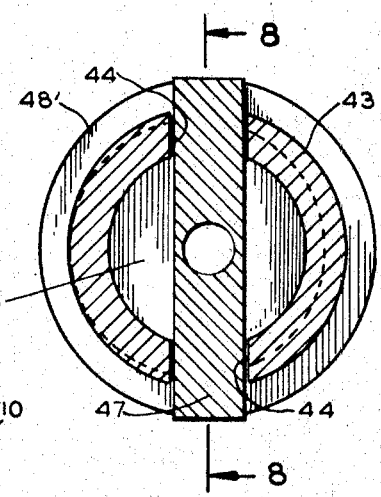
FIGURE 7 is a horizontal sectional view taken along line 7—7 of FIGURE 2 and showing the lower housing forming part of the clamping mechanism of the present invention.
Figure 6:
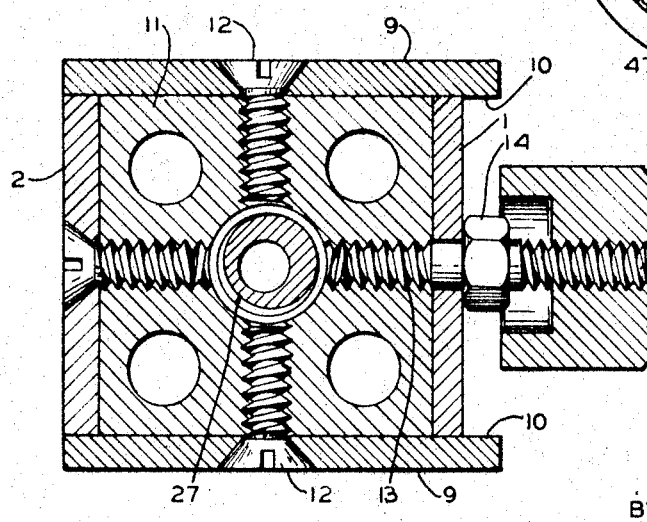
FIGURE 6 is a horizontal sectional view taken along line 6—6 of FIGURE 2 and showing some of the structural details of the housing forming part of the clamping mechanism.

Secured to the actuator plate 29 and extending upwardly therefrom is a stub shaft 33, to which is also secured an elongated plate 34, the latter being movable in elongated longitudinally extending slots 35 formed in the jaws 19 in the manner as illustrated in FIGURES 2 and 5. Furthermore, it can be seen that the slots 35 are larger than the stub shaft 33 so that when the jaws 19 come together, sufficient clearance is provided for the plate 34. These reliefs formed by the elongated slots 35 are more fully illustrated in FIGURE 5.

As the actuator shaft 27 is urged upwardly through the action of the compression spring 32, the flutes 21 of the jaws 19 will engage the wedging surfaces 6, 7 and as they shift upwardly, the jaws 19 will also be shifted toward each other or in engagement with the test sample $t$. Thus, it can be seen that the jaws 19 are always urged into engagement with the sample $t$. Furthermore, if a stress is placed upon the sample $t$ in a direction so that it is urged outwardly of the housing $h$, it can be seen that this will also tend to pull the jaws 19 upwardly and hence, will also tend to pull the jaws 19 closer together thereby providing a positive locking action.

Figure 4:
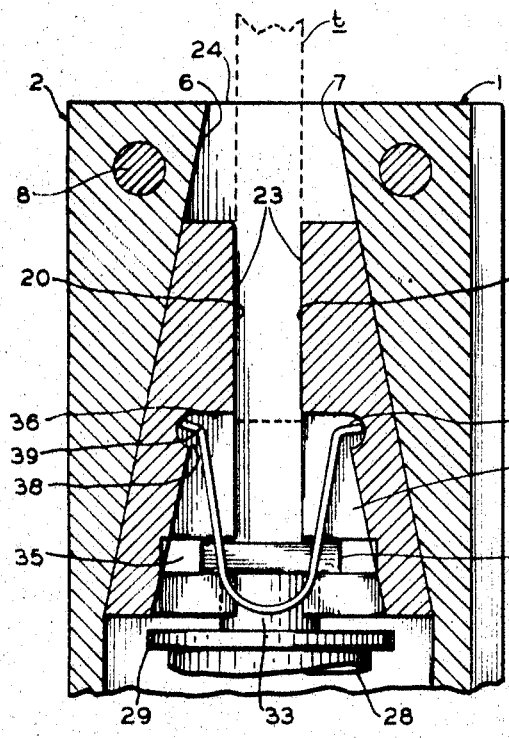
FIGURE 4 is a vertical fragmentary sectional view taken along line 4—4 of FIGURE 3 and showing the wedge spring clips of the present invention.

Each of the jaws 19 is provided with matching recesses 36 on each of their transverse ends for accommodating spring clips 37. Each of the recesses 36 is provided with enlarged lobes 38 at their upper ends for accommodating outwardly bent flanges 39 formed on each of the spring clips 37, all as in the manner illustrated in FIGURES 3 and 4. In this manner, the jaws 19 are held apart and against the wedge-forming walls 6, 7 when the actuator shaft 27 is urged downwardly in a manner to be hereinafter described. The spring clips 37 are preferably formed of any resilient metal, which has sufficient strength to hold the two jaws 19 in place.

Each of the end plates 9 is integrally provided with downwardly extending legs 40, which serve as brackets for supporting a retaining block 41, the latter being secured to the legs 40 by means of sheet metal screws 42. The retaining block 41 is integrally provided with a downwardly extending externally threaded nipple or so-called "socket" 43, which is hollow and is provided with a pair of diametrally opposed vertical slots 44. The socket 43 is open at its lower end and removably disposed therein is a centrally apertured coupling 45. The coupling is generally cylindrical in horizontal cross section and includes a cylindrical sleeve 46, which snugly but nevertheless removably fits within the central bore of the socket 43. Welded or otherwise rigidly secured to the cylindrical sleeve 46 is a guide bar 47, which extends through the vertical slots 44 formed in the wall of the socket 43. The cylindrical sleeve 46 is provided with a pair of diametrally opposed set screws 48, which are capable of engaging a support rod $r$, the latter being shown in dotted lines in FIGURE 8. It should be recognized that the support rod $r$ does not form part of the clamping device of the present invention and is one of the stationary supports with respect to the clamping device A. The support rod $r$ may be the lower stationary member to which the lower clamping device A of a pair of vertically spaced clamps is attached. In viscoelastometers of the type described herein, the support rods form a permanent part of such apparatus. A pair of opposed clamps such as the clamping device A are used to engage samples, such as the test sample $t$. The upper clamp is also connected to some type of support member, such as a rod $r$. In this case, the clamping device A is easily removable from the rod $r$ by merely releasing the set screws 48 and sliding the coupling 45 on the rod $r$. It should be recognized however, that the coupling 45 could remain in a fixed position on the rod $r$ when it is desired to remove the clamping device A for a change of samples. The shifting of the rod $r$ in the coupling 45 also provides a rough positional adjustment. A removable cap or so-called "sleeve-nut" 48' may be threadedly secured to the externally threaded portion of the socket 43.

The shaft 27 extends downwardly into the retainer block 41 and terminates along the lower margin of the retainer block 41 in the manner as illustrated in FIGURE 2. The shaft 27 is also provided with an externally threaded section 49 and concentrically disposed about the threaded section 49 is a stainless steel release nut 50, which may be knurled on its exterior face. The nut 50 is also interiorly threaded and vertically shiftable on the threaded section of the shaft 27. A stainless steel washer 51 is disposed on the upper surface of the releasing nut 50 and is movable with the nut 50. If desired, the washer 51 may be secured to the upper surface of the nut 50 by any suitable adhesive.

The releasing nut 50 and washer 51 provide a convenient means for releasing the test sample $t$ from the jaws 19. When the releasing nut 50 and washer 51 are threaded so that they shift upwardly on the externally threaded section 49, they will engage the undersurface of the base plate 11. Continued turning of the releasing nut 50 will cause the shaft 27 to shift downwardly in the housing $h$. As this occurs, the shaft 27 will shift downwardly and urge the jaws 19 in a downward direction. Since the jaws 19 are urged toward the wedging surfaces 6, 7 by means of the spring clips 37, the jaws 19 will spread apart thereby disengaging the test specimen $t$. It is to be noted that the shaft 27 cannot be completely removed from the housing due to the fact that the compression spring 32 will engage the plate 29 preventing complete removal. Furthermore, the lowermost movement of the shaft 27 is regulated by the plate 28 engaging the upper margin of the extension 26.

Figure 8:
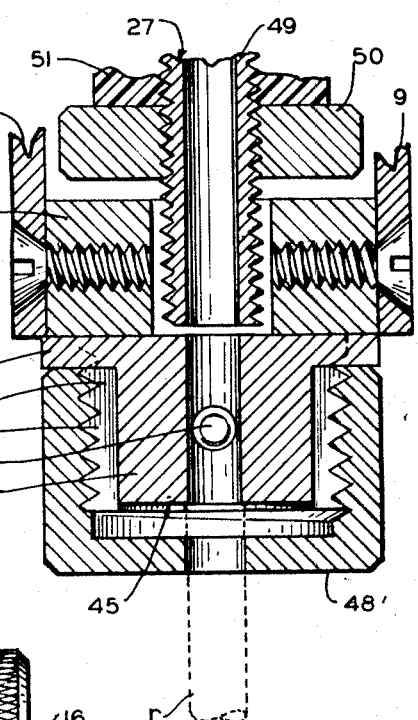
FIGURE 8 is a fragmentary sectional view taken along line 8—8 of FIGURE 7 showing the lower rod connection of the clamping device forming part of the present invention.

It is possible to provide a modified form of clamping device B which is similar to the previously described clamping device A and is more fully described in FIGURES 8 and 9. The clamping device A is similar in all respect to the clamping device B except that the clamping device B provides a set of rollers between the wedging surfaces 6, 7 and the jaws 19. The use of rollers thereby reduces the frictional contact between the wedging surfaces 6, 7 and the flutes 21. By reference to FIGURE 9, it can be seen that the central flute 21 on one jaw 19 is removed and a pintle 52 is rotatably mounted in two of the flutes. Rigidly mounted on the pintle 52 and being rotatable therewith is a barrel-shaped roller 53 having an annular surface which engages the wedging surface 6 of the front wall 1. The barrel-shaped roller 53 is unique in that it permits orientation of the front jaw 19 to account for non-linearity in the test sample $t$. It is also to be noted that the jaw 19 on which the roller 53 is mounted is slightly arcuate in the longitudinal dimension. The transverse walls of this latter jaw 19 are also slightly arcuate so that the jaw is, in effect, free floating and guided in its limited rotational movement by the roller 53.

The flutes 21 in the opposite jaw 19 are longitudinally drilled to rotatably accommodate a pair of vertically shaped pintles 54. Rigidly mounted on each of the pintles 54 and being rotatable therewith are a pair of longitudinally spaced cylindrically shaped rollers 55. Thus, it can be seen that four rollers have annular surfaces which engage the wedging surface 7 of the back wall 2 in the manner as illustrated in FIGURES 8 and 9. The clamping device B operates in similar manner to the clamping device A and the jaws 19 are still urged upwardly by the action of the compression spring 32. Furthermore, the jaws are released through the action of the releasing nut 50. The clamping device B is adaptable for use in cases where samples have a larger than desired degree of non-linearity in the flat surfaces.

The present invention also provides a jig J substantially as illustrated in FIGURE 10. The jig generally comprises a relatively flat support bar 56 with downwardly turned flanges 57 and relatively flat brace plates 58 secured to or integrally formed with the flanges 57. The flat support bar 56 is provided with one relatively short slot 59 capable of accommodating the stud 15 of one clamping device A or B. When a clamping device B is supported on the upper surface of the support bar 56, the flanges 10 of the device B will snugly engage the longitudinal margins of the bar 56. The slot 59 is located near one transverse end of the flat support bar 56. The bar 56 is provided with an elongated slot 60 at its opposite end for accommodating a stud 15 of another clamping device A or B. In this manner, the second clamping device may be positioned longitudinally in the slot 60 with respect to the first clamping device.

Operation

In use, the nut 16 is removed from the stud 15 of each of the pair of clamping devices A. The stud 15 of the first clamping device A is inserted through the slot 59 and the nut 16 is secured to the underside thereof. The stud 15 of the second clamping device A is inserted through the elongated slot 60 and the nut 16 is secured to the stud 15 on the underside of the bar 56. The second clamping device A is positioned at a desired distance from the first clamping device A for the desired length of the test specimen t.

The nuts 50 are tightened against the exterior surface of the base plate 11 so that the shaft 27 is urged downwardly causing the jaws 19 to spread apart. The sample t is then inserted through the apertures 24 of each of the clamping devices A. Thereafter, the nuts 50 are turned in the opposite direction so that they are moved downwardly on the shaft 27. As this occurs, the compression spring 32 bearing against the plate 29 will urge the shaft 27 upwardly within the housing h. The upward movement of the shaft 27 will cause the two jaws 19 to come together and thereby engage the test specimen t.

After the test specimen t is secured in the clamps A, the two clamps A are removed from the jig J by releasing the nut 16. The lower clamp A is secured to the support rod r by removal of the sleeve nut 48' and inserting the rod r in the coupling 45. After this is performed, the set screws 48 are tightened. After the rod r has been properly positioned with respect to and secured to the coupling 45, the coupling 45 is inserted in the socket 43. In this connection, it should be noted that the shaft 27 is hollow so that a portion of the rod r may extend upwardly into the shaft if the rod happens to be unusually long or if a rather large test specimen t is being used. In like manner, the upper clamp A may be secured to an upper support rod r. It should also be recognized that the clamping device A is adapted for securement to a flange having an aperture for accommodating the clamping device A, which is often found in many commercial testing devices. The socket 43 may extend through an aperture in a plate so that the underside of the retaining block 41 engages the underside of the plate. The cap 48' may then be screwed downwardly on the upper surface of the plate, thereby rigidly holding the clamping device A against the underside of the plate.

If the rod r to which the lower clamping device A is attached is urged downwardly, a stress would be placed upon the test specimen t. This stress may tend to move the specimen t outwardly of the lower housing h. However, upward movement on the specimen t would cause the jaws 19 to move upwardly in the housing h against the guide surfaces 6, 7. This will, in turn, tend to shift the jaws 19 toward each other creating more positive locking action. The action of the spring 32 against the jaws 19 can be augmented by turning the nut 50 down on the shaft 27 against the retaining block 41.

When it is desired to remove the test specimen t, the clamping device A is removed in the manner as previously described and the test specimen t is also removed by turning the releasing nut 50 and washer 51 against the underside of the base plate 11. The clamping device B operates in similar manner except that the jaws 19 move against the guide surfaces 6, 7 through the action of the rollers 53, 55.

It should be understood that changes and modifications in the form, construction, arrangement and combination of parts presently described and pointed out may be made and substituted for those herein shown without departing from the nature and principle of our invention.

Having thus described our invention what we desire to claim and secure by Letters Patent is:

1. A clamping device for holding elements subjected to stresses, said clamping device comprising:
   (1) an outer housing,
   (2) a pair of wedge-forming walls formed within said housing,
   (3) a pair of opposed cooperating element engaging jaws disposed within said housing and having matching walls in engagement with said wedge-forming walls,
   (4) a shaft having a threaded portion movable in and extending into said housing,
   (5) means operatively and mechanically connecting said shaft to said jaws so that said jaws are movable with said shaft thereby causing said jaws to move along said wedge-forming walls,
   (6) spring means operatively associated with said shaft normally urging said shaft into said housing and biasing said jaws along said walls toward each other.
   (7) a nut threadedly shiftable on the threaded portion of said shaft and being operatively engageable against said housing for directly acting upon and urging said shaft outwardly of said housing and thereby relaxing said spring means operating on said jaws, the amount of shaft movement outwardly of said housing being proportional to the degree of rotational movement of said nut against said housing thereby permitting said jaws to move away from each other to a selected distance for removal and insertion of an element into said housing.

2. The clamping device of claim 1 further characterized in that the means connecting the shaft to said jaws is a plate which fits within slots formed within said jaws and that the spring means associated with said shaft extends between said plate and said housing.

3. The clamping device of claim 1 further characterized in that the means connecting the shaft to said jaws is a plate which fits within slots formed within said jaws, said slots being larger than said plate thereby providing compensation for said plate when said jaws are moved together.

4. A clamping device for holding elements subjected to stresses, said clamping device comprising:
   (1) an outer housing,
   (2) a pair of wedge-forming walls formed within said housing,
   (3) a pair of opposed cooperating element engaging jaws disposed within said housing and having matching walls slightly spaced from said wedge-forming walls,
   (4) a plurality of rollers operatively mounted on the matching wall of one of said jaws and being engageable against one of said wedge-forming walls, at least a pair of said last named rollers being axially spaced and horizontally aligned, said rollers being relatively thin with respect to the overall width of said jaw so that they engage only a small surface area of said last named wedge-forming wall,
   (5) a single roller operatively mounted on the matching wall of the other of said jaws and being engageable against the other of said wedge-forming walls, said last named roller being non-cylindrical to obviate non-linearation in the movement of said jaws against said wedge-forming walls,
   (6) spring means in said housing and normally biasing said jaws toward each other,
   (7) and means for relaxing said spring means operating on said jaws and permitting said jaws to move away from each other for removal and insertion of an element into said housing.

5. The clamping device of claim 4 further characterized in that the single roller is barrel-shaped thereby accounting for non-linearity in the element being clamped.

6. The clamping device of claim 4 further characterized in that the single roller is barrel-shaped thereby accounting for non-linearity in the element being clamped and that said rollers on the other jaw are cylindrically shaped.

7. A clamping device for holding elements subjected to stresses, said clamping device comprising:
   (1) an outer housing,
   (2) a pair of wedge-forming walls formed within said housing,
   (3) a pair of opposed cooperating element engaging jaws disposed within said housing and having matching walls in engagement with said wedge-forming walls,
   (4) said matching walls having a plurality of relatively thin plates in engagement with said wedge-forming walls, said plates being separated by relatively large grooves for reducing frictional effects of the jaws moving against said wedge-forming walls and for reducing material mass thereby aiding heat transfer and gas flow past said jaws,
   (5) means in said housing cooperating with said jaws for holding said jaws in engagement with said wedge-forming walls and being movable against said wedge-forming walls,
   (6) spring means in said housing normally biasing said jaws along said walls toward each other,
   (7) and means for relaxing said spring means operating on said jaws and permitting said jaws to move away from each other for removal and insertion of an element into said housing.

8. The clamping device of claim 7 further characterized in that said plates are obliquely shaped.

9. The clamping device of claim 7 further characterized in that said outer housing is provided with a plurality of exteriorly extending relatively thin plates separated by a plurality of relatively large grooves for reducing material mass and thereby aiding heat transfer and gas flow past said housing.

10. A clamping device for holding elements subjected to stresses, said clamping device comprising:
   (1) an outer housing,
   (2) a pair of wedge-forming walls formed within said housing,
   (3) a pair of opposed cooperating element engaging jaws disposed within said housing and having matching walls in engagement with said wedge-forming walls,
   (4) means in said housing cooperating with said jaws for holding said jaws in engagement with said wedge-forming walls and being movable against said walls,
   (5) spring means in said housing normally biasing said jaws along said walls toward each other,
   (6) means for relaxing said spring means operating on said jaws and permitting said jaws to move away from each other for removal and insertion of an element into said housing,
   (7) a retaining block operatively secured to said housing,
   (8) a depending socket operatively secured to said retaining block and having an enlarged circular interior bore,
   (9) a cylindrically shaped coupling disposed within the interior bore of said socket and being removable therefrom,
   (10) locking means associated with said coupling for securing said coupling to a rod-like member which is stationary with respect to said clamping device and is inserted into the central bore of said coupling,
   (11) and means for removably holding said coupling in said socket.

11. The clamping device of claim 10 further characterized in that cooperating guide means is provided in said depending socket and said coupling for enabling proper radial alignment of said socket and coupling.

12. The clamping device of claim 10 further characterized in that said cooperating guide means comprises a bar secured to said socket movable in a vertical slot formed in said coupling.

13. The clamping device of claim 10 further characterized in that a sleeve is removably secured to said socket for holding said clamping device in an alternate manner.

14. A clamping device for holding elements subjected to stresses, said clamping device comprising:
   (1) an outer housing,
   (2) a pair of wedge-forming walls formed within said housing,
   (3) a pair of opposed cooperating element engaging jaws disposed within said housing and having matching walls in engagement with said wedge-forming walls,
   (4) a shaft movable in and extending into said housing,
   (5) a pair of opposed slots formed in said jaws,
   (6) a plate mounted on the inner end of said shaft and being disposed in said slots causing movement of said jaws with said shaft, said slots being larger than said plate to compensate for said plate when said jaws are urged toward each other,
   (7) a plate secured to said shaft and being movable therewith,
   (8) a spring disposed about said shaft and being interposed between said plate and said housing urging said shaft inwardly in said housing thereby causing said jaws to move along said wedge-forming walls and toward each other,
   (9) said shaft having an externally threaded portion,
   (10) a nut threadedly shiftable on said externally threaded portion and being operatively engageable against said housing for directly acting upon and urging said shaft outwardly of said housing and relaxing the spring operating on said jaws, the amount of shaft movement outwardly of said housing being proportional to the degree of rotational movement of said nut against said housing, thereby permitting said jaws to move away from each other for removal and insertion of an element into said housing,
   (11) a retaining block operatively secured to said housing,

11

(12) a depending socket operatively secured to said retaining block and having a large circular interior bore,
(13) a cylindrically shaped coupling disposed within the interior bore of said socket and being removable therefrom, said coupling having a center bore,
(14) locking means associated with said coupling for securing said coupling to a rod-like member which is stationary with respect to said clamping device and is inserted into the central bore of said coupling,
(15) and means for removably holding said coupling in said socket.

15. A clamping system for properly aligning and holding elements subjected to stresses, said clamping system comprising in combination:
(1) a supporting plate having a pair of apertures,
(2) a first and second spaced opposed clamping device capable of being removably mounted on said plate,
(3) an extended element on said first clamping device insertable in one of said apertures on said plate,
(4) an extended element on said clamping device insertable into the other of said apertures on said plate for adjustably positioning said second clamping device with respect to said first clamping device,
(5) each of said clamping devices comprising:
(a) an outer housing,
(b) a pair of wedge-forming walls formed within said housing,
(c) a pair of opposed cooperating element engaging jaws disposed within said housing and having matching walls in engagement with said wedge-forming walls,
(d) a shaft having a threaded portion movable in and extending into said housing,
(e) means operatively and mechanically connecting said shaft to said jaws so that said jaws are movable with said shaft thereby causing said jaws to move along said wedge-forming walls,
(f) spring means operatively associated with said shaft normally urging said shaft into said housing and biasing said jaws along said walls toward each other,
(g) a nut threadedly shiftable on the threaded portion of said shaft and being operatively engageable against said housing for directly acting upon and urging said shaft outwardly of said housing and thereby relaxing said spring means operating on said jaws, the amount of shaft movement outwardly of said housing being proportional to the degree of rotational movement of said nut against said housing thereby permitting said jaws to move away from each other to a selected distance for removal and insertion of an element into said housing.

16. The clamping system of claim 15 further characterized in that the first aperture has a slightly larger cross sectional size than the extended element on said first clamping device and that said second aperture is elongated in the form of a slot for positionally locating said second clamping device with respect to said first clamping device.

17. The clamping system of claim 15 further characterized in that each of said extended elements are threaded and provided with removable nuts for removable securement to said plate.

References Cited

UNITED STATES PATENTS

| 308,659 | 12/1884 | Emery | 73—103 |
|---|---|---|---|
| 517,356 | 3/1894 | Miller | 73—103 X |
| 2,447,660 | 8/1948 | Miklowitz | 73—103 |
| 3,107,524 | 10/1963 | O'Connor | 73—103 |

FOREIGN PATENTS

| 406,194 | 11/1924 | Germany. |
|---|---|---|
| 534,747 | 9/1931 | Germany. |
| 1,363,284 | 5/1964 | France. |
| 563,166 | 10/1932 | Germany. |

OTHER REFERENCES

MTS Technical Bulliten T.B. 641.01–1. Published by Research Incorporated, Minneapolis, Minn., Jan. 4, 1965, class 73, sub 103.

Wilsdorf, D. K., Kaghavan, K. S., New Tensile Testing Machine for thin specimens. Review of Scientific Instruments vol. 33 No. 9, September 1967 Class 73, Sub 95.

RICHARD C. QUEISSER, Primary Examiner

J. W. MYRACLE, Assistant Examiner

U.S. Cl X.R.

279—28